UNITED STATES PATENT OFFICE.

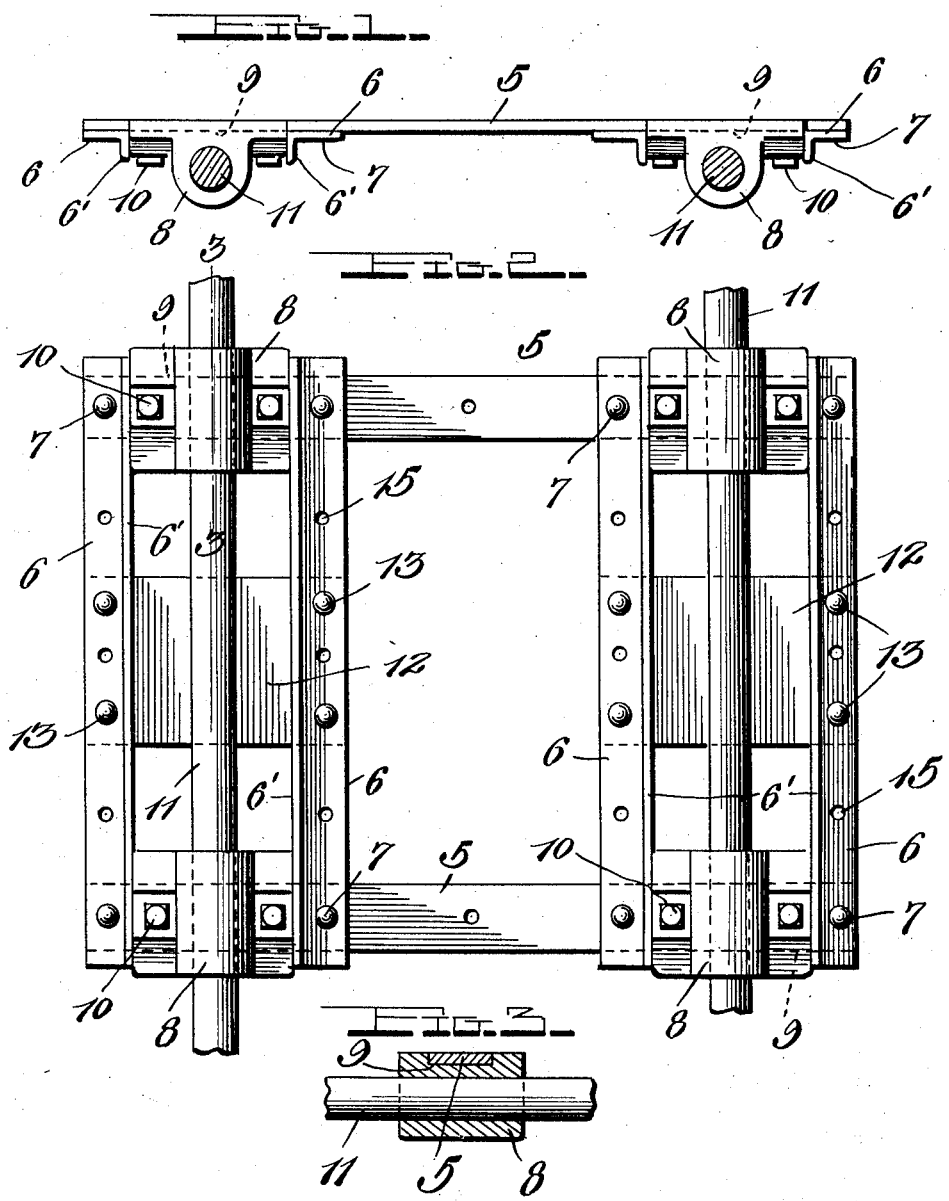

WILBERT C. SCHADE, OF CHERRY TREE, PENNSYLVANIA.

CAR-TRUCK.

1,063,740.  Specification of Letters Patent.  Patented June 3, 1913.

Application filed March 30, 1912, Serial No. 687,470. Renewed November 1, 1912. Serial No. 729,130.

*To all whom it may concern:*

Be it known that I, WILBERT C. SCHADE, a citizen of the United States, residing at Cherry Tree, in the county of Indiana and State of Pennsylvania, have invented certain new and useful Improvements in Car-Trucks, of which the following is a specification, reference being had to the accompanying drawings.

This invention relates to improvements in car trucks and more particularly to a truck of that type particularly designed and used upon mining cars, the present invention having for its primary object the provision of a truck of this character which is extremely strong and durable in its construction, consists of comparatively few elements and may be manufactured at a nominal cost.

Another object of the invention is to provide a plurality of frame members which are so assembled and connected that a maximum of rigidity in the entire structure is obtained, certain of said elements coöperating with the bearings of the truck axles so as to maintain said bearings rigidly in position and relieve the several truck elements of undue strain.

With the above and other objects in view, the invention consists of the novel features of construction, combination and arrangement of parts hereinafter fully described and claimed, and illustrated in the accompanying drawings, in which—

Figure 1 is a side elevation of a mining car truck embodying the present invention; Fig. 2 is a bottom plan view; and Fig. 3 is a detail section taken on the line 3—3 of Fig. 2.

Referring in detail to the drawing 5 designates the spaced longitudinal bars of the truck frame which are preferably constructed of steel. These parallel bars are connected at their corresponding ends by means of the spaced parallel transverse angle bars 6, the horizontal flanges of said angle bars being disposed upon the bottom faces of the longitudinal bars 5 and rigidly secured thereto by means of rivets or analogous fastening devices indicated at 7. The vertical depending flanges 6' of the angle bars 6 are arranged in opposed relation and between the same the journal boxes or bearings 8 are mounted. The upper surfaces of these bearings are provided with longitudinally extending channels or grooves 9 to receive the longitudinal bars 5 of the frame, the upper surfaces of said bars being flush with the upper surfaces of the bearing members. Spaced bolts 10 rigidly secure said bearings upon the ends of the longitudinal frame bars. These bearings are bored to receive the transversely disposed wheel axles 11. The parallel transverse frame bars 6 are connected and braced intermediate of their ends by means of the plates 12 which are disposed upon the upper surfaces of the horizontal flanges of said bars and securely riveted thereto as shown at 13. The longitudinal and transverse frame bars 5 and 6 of the truck frame are provided with openings 14 and 15 respectively for the accommodation of suitable securing bolts whereby the body of the car is secured upon the truck.

From the above it will be observed that the axle bearings 8 abut against the vertical depending flanges 6' of the transverse frame bars 6 whereby any tendency of said bearings to move longitudinally of the truck frame is overcome, and the bolts 10 thus relieved of considerable strain which would otherwise devolve thereon. The axle bearings are thus at all times rigidly held in position, while at the same time the transverse angle bars 6' serve in connection with the longitudinal frame bars 5 to produce a truck frame of extreme rigidity and great strength, said bars being permanently riveted together.

It will of course, be understood that I am by no means limited to the specific form and proportions of the various parts as shown in the drawings, in putting the invention into practice, and reserve the right to make such modifications therein as may fairly fall within the scope of the appended claims.

Having thus described the invention what is claimed is:—

1. In a car truck, parallel longitudinal bars, spaced transverse angle bars arranged at each end of the longitudinal bars and beneath the same and rigidly secured to said longitudinal bars, bracing plates connecting said angle bars, the vertical depending flanges of said angle bars being opposed, axle bearing members arranged between the opposed flanges of the angle bars at opposite ends thereof, and bolts rigidly securing said bearing members to the ends of the longitudinal bars.

2. In a car truck, spaced longitudinal bars, spaced transverse angle bars rigidly connecting the longitudinal bars at their ends, said angle bars having opposed depending flanges, bracing plates connecting said angle bars, axle bearing members arranged between the depending flanges of the angle bars at their ends and beneath the longitudinal bars, said bearing members being provided in their upper surfaces with longitudinally extending channels to receive the longitudinal bars, and bolts rigidly securing the bearing members to said longitudinal bars.

In testimony whereof I hereunto affix my signature in the presence of two witnesses.

WILBERT C. SCHADE.

Witnesses:
J. E. McCORMICK,
GEO. E. MOSER, Jr.

Copies of this patent may be obtained for five cents each, by addressing the "Commissioner of Patents Washington, D. C."